(12) United States Patent
Gadkaree et al.

(10) Patent No.: US 10,069,134 B2
(45) Date of Patent: *Sep. 4, 2018

(54) ENCAPSULATED LITHIUM PARTICLES AND METHODS OF MAKING AND USE THEREOF

(71) Applicant: Corning Incorporated, Corning, NY (US)

(72) Inventors: Kishor Purushottam Gadkaree, Painted Post, NY (US); Rahul Suryakant Kadam, Corning, NY (US); Andrew Fleitz Husted, Wellsburg, NY (US)

(73) Assignee: Corning Incorporated, Corning, NY (US)

(*) Notice: Subject to any disclaimer, the term of this patent is extended or adjusted under 35 U.S.C. 154(b) by 559 days.

This patent is subject to a terminal disclaimer.

(21) Appl. No.: 14/493,886

(22) Filed: Sep. 23, 2014

(65) Prior Publication Data

US 2016/0087263 A1 Mar. 24, 2016

(51) Int. Cl.
*H01M 4/137* (2010.01)
*H01M 4/136* (2010.01)
(Continued)

(52) U.S. Cl.
CPC .............. *H01M 4/137* (2013.01); *B22F 1/02* (2013.01); *C01D 15/00* (2013.01); *C01D 15/04* (2013.01);
(Continued)

(58) Field of Classification Search
CPC ...... H01M 4/362; H01M 4/366; H01M 4/381; H01M 4/382; H01M 4/40; H01M 4/405;
(Continued)

(56) References Cited

U.S. PATENT DOCUMENTS 6,911,280 B1 * 6/2005 De Jonghe ............ C03C 17/245
429/137
7,588,623 B2 * 9/2009 Dover ................... B22F 1/0085
75/332

(Continued)

FOREIGN PATENT DOCUMENTS

WO 2008045557 4/2008

OTHER PUBLICATIONS

Wright et al., Vegetable Oil-based Ricinelaidic Acid Organogels-Phase Behavior, Microstructure, and Rheology, AOCS Press, Urbana, pp. 81-99, 2011 (month unknown).*

(Continued)

*Primary Examiner* — Ula C Ruddock
*Assistant Examiner* — Amanda Barrow
(74) *Attorney, Agent, or Firm* — Shantanu Pathak

(57) ABSTRACT

An encapsulated lithium particle including:
a core comprised of at least one of: lithium; a lithium metal alloy; or a combination thereof; and
a shell comprised of a lithium salt, an oil, and optionally a binder, and
the shell encapsulates the core, and the particle size is from 10 to 500 microns.
Also, disclosed is a method of making the particle and using the particle in electrical devices such as a capacitor or a battery.

19 Claims, 5 Drawing Sheets

(51) Int. Cl.
  H01M 4/60    (2006.01)
  H01M 4/36    (2006.01)
  H01M 4/62    (2006.01)
  C09K 3/00    (2006.01)
  B22F 1/02    (2006.01)
  C01D 15/00   (2006.01)
  H01M 4/38    (2006.01)
  H01M 4/58    (2010.01)
  C01D 15/04   (2006.01)
  H01M 4/00    (2006.01)
  H01M 10/0525 (2010.01)

(52) U.S. Cl.
  CPC .............. *C09K 3/00* (2013.01); *H01M 4/136* (2013.01); *H01M 4/366* (2013.01); *H01M 4/382* (2013.01); *H01M 4/58* (2013.01); *H01M 4/604* (2013.01); *H01M 4/623* (2013.01); *H01M 4/00* (2013.01); *H01M 10/0525* (2013.01); *Y10T 428/2989* (2015.01)

(58) Field of Classification Search
  CPC ........ B22F 1/00; B22F 1/0062; B22F 1/0088; B22F 1/02
  See application file for complete search history.

(56) References Cited

U.S. PATENT DOCUMENTS

| | | | | |
|---|---|---|---|---|
| 7,598,000 | B1* | 10/2009 | Chan | H01M 2/16 429/129 |
| 8,920,925 | B2* | 12/2014 | Gadkaree | B22F 1/02 427/126.1 |
| 2004/0253510 | A1 | 12/2004 | Jonghe et al. | |
| 2008/0283155 | A1* | 11/2008 | Yakovleva | B22F 1/0062 148/280 |
| 2009/0035663 | A1* | 2/2009 | Yakovleva | B22F 1/0062 429/231.95 |
| 2011/0104571 | A1* | 5/2011 | Zhamu | H01B 1/122 429/231.95 |
| 2012/0141873 | A1 | 6/2012 | Kim et al. | |
| 2013/0122318 | A1 | 5/2013 | Wietelmann | |
| 2013/0157106 | A1* | 6/2013 | Lee | H01M 2/16 429/144 |
| 2013/0224603 | A1* | 8/2013 | Chen | B82Y 30/00 429/322 |
| 2013/0244876 | A1* | 9/2013 | Jabs | A01N 27/00 504/128 |
| 2014/0134438 | A1* | 5/2014 | Gadkaree | B22F 1/02 428/402.24 |
| 2014/0146440 | A1* | 5/2014 | Gadkaree | H01G 11/06 361/505 |
| 2014/0293507 | A1* | 10/2014 | Gadkaree | H01G 9/0029 361/502 |
| 2015/0228978 | A1* | 8/2015 | Gadkaree | H01M 10/42 429/199 |

OTHER PUBLICATIONS

Frank Cassel et al., "Implementation and Effect of Stabilized Lithium Metal Powder on Mesocarbon Negative Electrodes", ECS Transactions, 11(29), pp. 157-166 (2008).

International Search Report, issued in connection with corresponding PCT application No. PCT/US2015/051118, dated Dec. 9, 2015.

* cited by examiner

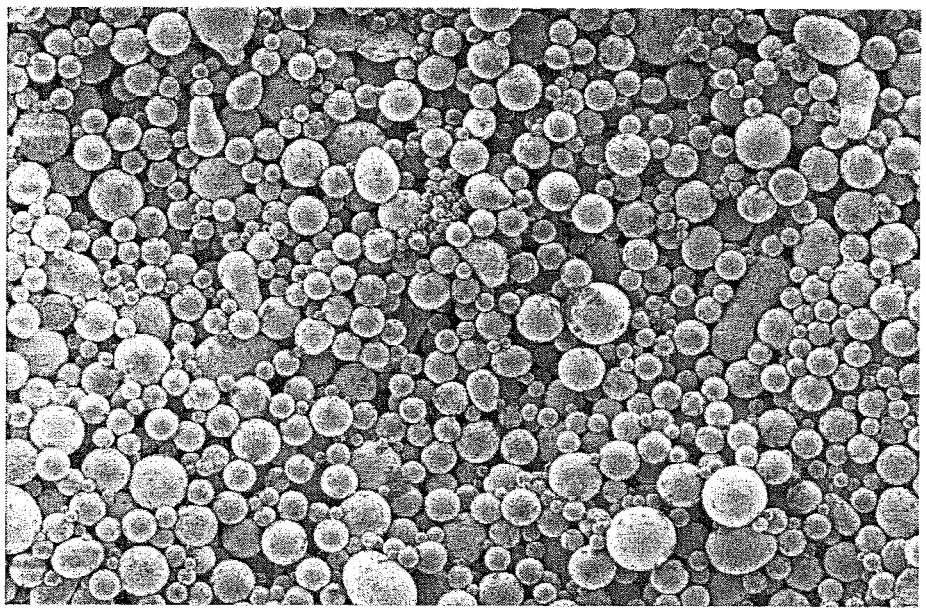
FIG. 2A  |—————| 500 MICRONS
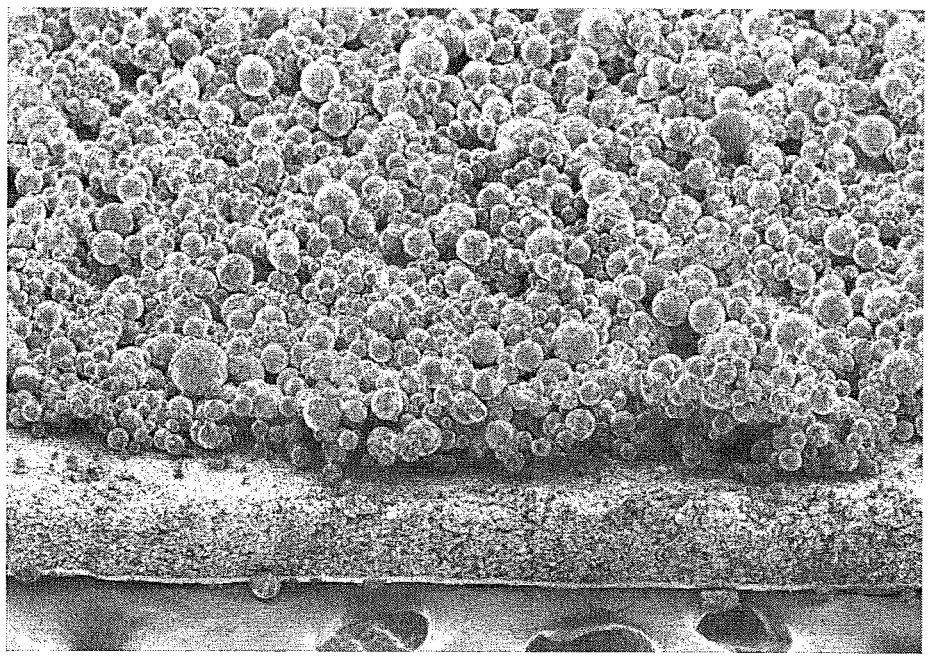
FIG. 2B  |—————| 500 MICRONS

ENCAPSULATED LITHIUM PARTICLES AND METHODS OF MAKING AND USE THEREOF

CROSS-REFERENCE TO RELATED CO-PENDING APPLICATIONS

The present application is related to commonly owned and assigned U.S. Ser. No. 13/673,019, filed Nov. 9, 2012, entitled "LITHIUM COMPOSITE PARTICLES," but does not claim priority thereto.

The entire disclosure of each publication or patent document mentioned herein is incorporated by reference.

BACKGROUND

The disclosure relates to lithium materials, and more specifically to encapsulated lithium particles, and use of the encapsulated lithium particles in an electrode such as a lithium ion capacitor.

SUMMARY

In embodiments, the disclosure provides an encapsulated lithium particle and a method to deposit the particles on an electrode, which encapsulated particle is stable against oxygen and moisture, and which particle can be used in an electrochemical device, such as a lithium ion capacitor or a lithium battery.

BRIEF DESCRIPTION OF THE DRAWINGS

In embodiments of the present disclosure:

FIGS. 2A and 2B show SEM micrographs of the disclosed encapsulated Li particles comprising $LiPF_6$-coated lithium metal particles.

DETAILED DESCRIPTION

Figure 1A:
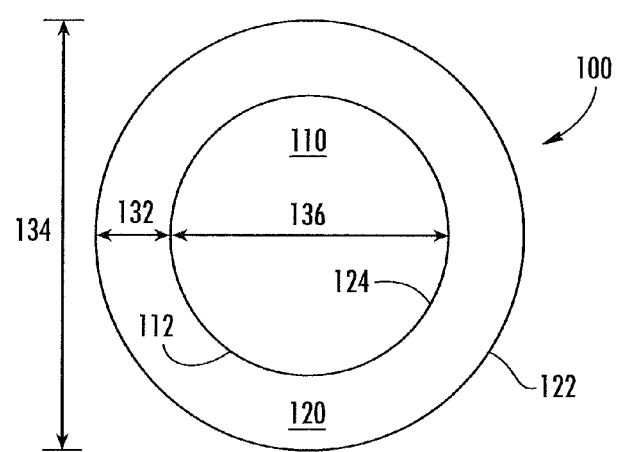
FIGS. 1A and 1B, respectively, show a cross-sectional view of an exemplary encapsulated lithium particle and an exemplary electrode structure having a layer of the disclosed encapsulated lithium particles.

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

Definitions

"Encapsulated," "encap," "composite," or like terms refer to a lithium-containing core particle and having an encapsulating shell that includes a lithium metal salt, an oil, and optionally a binder.

"Lithium ion capacitor," "LIC," or like terms refer to a hybrid type of capacitor related to supercapacitor energy storage devices. A hybrid type of capacitor is capable of storing charge electrostatically and electrochemically. Activated carbon can be used as cathode. The anode of the LIC can be a carbon material which can be pre-doped with a source of lithium ion. Pre-doping reduces the potential of the anode and allows a relatively high output voltage compared with other supercapacitors. Unlike electrochemical double layer capacitors (EDLC's) which store energy based on a charge double layer mechanism on both electrodes, a hybrid lithium ion capacitor stores energy on the cathode via the charge double layer mechanism whereas energy storage on anode is via a faradaic mechanism. As a result, the energy density in such devices is five times higher than an EDLC, while maintaining the power at about three to four times that of the EDLC. In spite of the faradaic mechanism of energy storage, these devices still show very high cycle life in excess of 200,000 cycles, making the devices attractive for many applications. LICs utilize a high surface area (typically greater than 1000 $m^2/g$) carbon on the positive electrode and an intercalating carbon with low porosity and low surface area (typically less than 300 $m^2/g$) on the anode, which electrode disposition supports the fast chemical intercalation and de-intercalation of lithium ions. During charge and discharge, lithium intercalation and de-intercalation occurs within the bulk of the negative electrode, whereas anion adsorption and desorption takes place on the positive electrode. The adsorption and desorption on the positive electrode is a non-faradaic reaction which is relatively faster than the lithium ion intercalation and de-intercalation on the negative electrode. Since the lithium ions contained in the electrolyte are not sufficient for the operation of the device, a lithium ion source is needed. This extra lithium ion source in a lithium ion capacitor can be made available by inserting lithium metal in the negative/anode electrode. Commercially, a lithium metal foil is short circuited with the negative/anode electrode to insert the lithium into the negative/anode electrode in lithium ion capacitor. This approach necessitates use of a lithium metal electrode in the device creating many safety issues. Alternatively, the lithium metal from the lithium foil may also be electrochemically pre-inserted in the negative/anode electrode. However, the short circuit and electrochemical technique is an intricate and difficult tedious technique and is not of practical value. To circumvent the problem presented by the short-circuit or electrochemical doping method of lithium, the disclosure provides a method of making where a layer of stable encapsulated lithium particle powder is formed on the surface of the anode, and which surface lithium powder acts as a source of lithium for lithium insertion in the anode.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

"Optional" or "optionally" means that the subsequently described event or circumstance can or cannot occur, and that the description includes instances where the event or circumstance occurs and instances where it does not.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, times, and like aspects, and ranges thereof, are for illustration only; they do not exclude other defined values or other values within defined ranges. The composition and methods of the disclosure can include any value or any combination of the values, specific values, more specific values, and preferred values described herein, including explicit or implicit intermediate values and ranges.

Lithium metal is used in a wide variety of applications, including organometallic and polymer synthesis, and electrochemical devices such as rechargeable lithium batteries, ultracapacitors, and lithium-ion batteries. Such electrochemical devices can be used in many contexts, including in mobile electronic devices such as phones, tablets, and notebook computers, and in automobiles such as electric vehicles and hybrid vehicles. However, lithium metal in many forms is an unstable material that may ignite and burn in oxygen-containing environments, including air, or upon exposure to water or water vapor. Additionally, lithium fires are difficult to extinguish and may require dry powder fire extinguishers. Accordingly, lithium metal may have a short shelf life and may be dangerous to store.

U.S. Pat. No. 7,588,623, mentions a method to make stabilized lithium metal power, which method consists of first heating lithium metal to a temperature above its melting point followed by spraying the molten lithium through an atomizing nozzle into droplets, and then into an atmosphere to fluorinate the powder surface to stabilize it.

The presently disclosed method of making is significantly different from the method in U.S. Pat. No. 7,588,623, and can be carried out entirely at lower temperatures and below the melting point of lithium. The presently disclosed method is safer, simpler, and less expensive compared to the U.S. Pat. No. 7,588,623 method. Another advantage of the disclosed method is that the Li metal is coated with the electrolyte salt and is compatible with the electrochemistry of the cell. Additionally, the presence of a hydrophobic oil present in the outer protective shell of the particle extends the stability of encapsulated lithium particle to ambient conditions.

US2013/0122318, to Wietelmann, mentions a surface-passivated lithium metal, which has a composite top layer containing or consisting of at least two poorly soluble components containing lithium. Production of the surface-passivated lithium metal such that lithium metal below 180 degree C., thus in the solid state, is transformed into an inert, aprotic solvent with a passivating agent of the general formula $Li\{P(C_2O_4)_{-x/2}F_x\}$ where x=0, 2, or 4.

US2004/0253510, to Jonghe, et al., mentions that active metal anodes can be protected from deleterious reaction and voltage delay in an active metal anode-solid cathode battery cell can be significantly reduced or completely alleviated by coating the active metal anode (e.g., Li) surface with a thin layer of a chemical protective layer incorporating aliovalent (multivalent) anions on the lithium metal surface. Such an aliovalent surface layer is conductive to Li-ions but can protect lithium metal from reacting with oxygen, nitrogen or moisture in ambient atmosphere thereby allowing the lithium material to be handled outside of a controlled atmosphere, such as a dry room. Particularly, preferred examples of such protective layers include mixtures or solid solutions of lithium phosphate, lithium metaphosphate, and/or lithium sulfate. These protective layers can be formed on the Li surface by treatment with diluted solutions of the following acids: $H_3PO_4$, $HPO_3$, and $H_2SO_4$ or their acidic salts in a dry organic solvent compatible with Li by various techniques. Such chemical protection of the Li or other active metal electrode significantly enhances active metal electrode protection and reduces the voltage delay due to protected anode's improved stability toward the electrolyte.

In embodiments, the disclosure provides an encapsulated lithium particle, which encapsulated lithium particle includes a core that comprises, for example, lithium metal and a shell that encapsulates the core. The shell can include, for example, a lithium salt, an oil, and optionally a binder. The encapsulated particle can have a particle size or diameter of, for example, from about 1 to about 500 microns. In embodiments, the encapsulated particle can have a diameter of from 1 to 100 microns; and the shell can have an average thickness of from 1 to 50 microns.

In embodiments, the core can be present, for example, in from 50 to 90 wt % based on the total weight of the particle; the shell can be present, for example, in from 50 to 10 wt % based on the total weight of the particle, the shell can have, for example, an average thickness of from 0.01 to 100 microns, and the shell comprises, for example, from 70 to 99.9 wt % of the lithium salt and from 0.1% to 30 wt % of the oil based on the total weight of the shell.

In embodiments, the disclosure provides a lithium ion capacitor, and a method of making the capacitor which involves forming an encapsulated lithium powder and coating the encapsulated lithium powder on an anode or negative electrode.

In embodiments, the disclosure provides a method of making including coating the anode or negative electrode with a slurry mixture containing a lithium metal powder or lithium metal alloy powder dispersed in a solution of a lithium salt, an oil such as mineral oil, and an optional binder, for example, a thermoplastic polymer, such as styrene butadiene rubber (SBR), in an organic solvent. The coating method provides an adhered layer of encapsulated lithium powder formed on the surface of the anode or negative electrode. The coating method can be used for making energy storage devices where lithium metal is required for lithiation of anodes or negative electrodes. The disclosure also provides demonstrative examples of the performance of a lithium ion capacitor made with its anode or negative electrodes coated with the disclosed encapsulated lithium particles. The addition of an oil to the encapsulating coat containing $LiPF_6$ improves the high discharge rate performance of the cells. Addition of an oil to the encapsulating coat provides advantages such as the encapsulated lithium powder can be produced more reliably, and have improved performance. The discharge rate performance of the device is significant since it is a power supply device and the device is expected to perform well at very high discharge rates.

In embodiments, the disclosure provides a method for making an encapsulated lithium particle including, for example, contacting a liquid or gas dispersed lithium-containing core particle and a shell forming mixture that includes a complex lithium metal salt, an oil, optionally a binder, and a solvent; and removing the solvent to form a particle that includes a lithium-containing core, and a shell that includes a lithium metal salt, an oil, and optionally a binder, which shell encapsulated the core. The encapsulated lithium particle is stable to ambient conditions for several hour to several weeks depending on storage conditions.

In embodiments, the disclosure provides a method of making a coated electrode including:

coating the disclosed encapsulated lithium powder on an anode or negative electrode of a electrochemical device, such as a lithium ion capacitor or lithium ion battery.

The disclosed method is highly reproducible and easy to scale up. The single-step coating can be accomplished with different coating techniques such as spray coating or dip coating. The single-step coating can include, for example, coating at least a portion of a anode or negative electrode from a slurry mixture of a lithium metal powder dispersed in a mixture or solution of a lithium salt, an oil such as mineral oil, and optionally a binder, for example, a polymer such as styrene butadiene rubber (SBR), in an organic solvent. Various suitable dry organic solvents include, for example, THF, monoglyme, diglyme, n-methyl pyrolidinone, dimethyl acetamide, dimethyl formamide, and like dry solvents, or mixtures thereof, can be used for the coating method. The weight % of organic solvent to the total solids, total liquids dissolved, total liquids or dispersed, can vary, for example, from 50 wt % organic solvent to 50 wt % of the solutes (solids, liquids, or both, that are dispersed or dissolved in the organic solvent) to 95 wt % organic solvent to 5 wt % of the solutes (solids, liquids, or both, that are dispersed or dissolved in the organic solvent).

In embodiments, in a specific example, the weight % of $LiPF_6$ as the lithium salt to mineral oil as the oil component, can vary, for example, from 98 wt % $LiPF_6$ to 2 wt % mineral oil to 70 wt % $LiPF_6$ to 30 wt % mineral oil. The weight % of the mixture of lithium metal powder, lithium salt, oil, and binder can vary, for example, from a 99.9 wt % mixture of the lithium metal powder, the lithium salt, and oil, to 0.1 wt % of the binder (such as SBR) to a mixture of 98 wt % of the lithium metal powder, the lithium salt, and oil, to 2 wt % of the binder. The disclosure also provides performance results for lithium ion capacitors that were made with anodes or negative electrodes that were coated with the disclosed encapsulated lithium composite powder particles.

In embodiments, the disclosure provides encapsulated lithium particles, which generally comprise a core and a shell that encapsulates and stabilizes the core. The core can comprise lithium metal or a lithium metal alloy. The shell, which comprises a lithium salt, an oil, and an optional binder, encapsulates the core. The shell is preferably hermetic and prevents or substantially inhibits water or air, including oxygen, from contacting and reacting with the core. The encapsulated lithium particles are stable with respect to ambient exposure.

Referring to the Figures, FIG. 1A is a schematic diagram of a cross-sectional view of an exemplary encapsulated lithium particle (not to scale). FIG. 1A shows schematically in cross-section a single, encapsulated lithium particle (100). Particle (100) includes a core (110) and a shell (120) that encapsulates the core. The core (110) can comprises a unitary body defining an outer surface (112). The shell (120) is in direct physical contact with the outer surface (112) of the core (110) along an inner surface (124) of the coating (120). The shell coating comprises a compatible inorganic or organic salt, an oil, and optionally a binder.

In embodiments, the core (110) comprises elemental lithium metal. In embodiments, the core can comprise an alloy of lithium. Examples of such alloys comprise lithium and one or more of Al, Si, Ge, Sn, Pb, Bi, or mixture thereof.

In embodiments the shell (120) comprises a lithium salt that can include, for example, $LiPF_6$, $LiBF_4$, $LiClO_4$, $LiAsF_6$, $LiCF_3SO_3$, lithium bis-oxalatoborate, lithium fluoro-oxalatoborate, and like salts, or mixtures thereof. A lithium salt can be any ionic compound comprising lithium and an additional metal, metalloid, or non-metal atom that does not itself ionize and which is soluble or dispersible in a suitable solvent. For instance, $LiPF_6$ contains lithium and phosphorus as metal atoms, but the phosphorus does not ionize by itself. Rather, phosphorus ionizes as the $PF_6^-$ ion. In a further example, $LiBF_4$ contains lithium metal and the metalloid boron. Although lithium ionizes ($Li^+$), boron does not ionize by itself, but as the $BF_4^-$ ion. In a still further example, $LiClO_4$ contains lithium metal and the non-metal atoms chlorine and oxygen. The non-metal atoms ionize as the perchlorate ion ($ClO_4^-$). A suitable solvent can be, for example, selected from THF, methylene chloride, toluene, diethyl ether, monoglyme, diglyme, n-methyl pyrolidinone, dimethyl acetamide, dimethyl formamide, and like solvents, or a mixture thereof.

In embodiments, the method of making the encapsulated particles is preferably accomplished entirely below the melting point of lithium.

Lithium salts, including complex lithium salts, can be used in lithium-ion batteries and lithium-ion capacitors as components of a liquid electrolyte. The complex lithium salts can be dissolved in a solvent to form an electrolyte solution for use in conjunction with an electrochemical device. Example solvents for forming an electrolyte include organic solvents or mixtures of organic solvents such as dimethyl carbonate, methyl propionate, ethylene carbonate, propylene carbonate, and other solvents suitable for use in an electrolyte where the lithium ion is the charge carrier.

The oil can be selected, for example, from the group consisting of a mineral oil, a transformer oil or insulating oil, a silicone oil, a silicone-based oil, a fluorinated hydrocarbon, a vegetable based oil, white oil, liquid paraffin, pariffinum liquidum, liquid petroleum, or combinations thereof. Other mineral oil names include white oil, liquid paraffin, pariffinum liquidum, and liquid petroleum. There are three basic classes of refined mineral oils: paraffinic oils, based on n-alkanes; naphthenic oils, based on cycloalkanes; and aromatic oils, based on aromatic hydrocarbons. Pentaerythritol tetra fatty acid natural and synthetic esters are a common mineral oil alternative.

Referring again to FIG. 1A, the core (110) has a particle size (136), and the encapsulated lithium particle (100) has a particle size (134). "Particle size" refers to the maximum linear dimension associated with a particle. For a spherical particle, for example, the particle size is the diameter. For an oblong particle, the particle size is the "length" of the particle. An example average particle size for a plurality of encapsulated particles (100) can be, for example, from about 1 to 500 microns, such as 5, 10, 20, 50, 100, 150, 200, 300, 400, and 500 microns, including intermediate values and ranges, and can be defined for a given material batch over a range of any two of the aforementioned values.

The shell (120) can have a thickness (132) defined as the average shortest distance between the inner surface (124) of the shell and the outer surface (122) of the shell. In embodiments, the shell can have a substantially uniform thickness or a variable thickness depending, for example, on the method used to form the shell. An example average thickness for the shell (124) can be from about 10 nm to 100 microns, such as 0.01, 0.02, 0.05, 0.1, 0.2, 0.5, 1, 2, 5, 10, 20, 50, and 100 microns, including intermediate values and ranges, which can be defined for a given material batch over a range of any two of the aforementioned thickness values.

In embodiments, the encapsulated lithium particle (100) can further comprise a shell having a binder selected from, for example, the polymer group consisting of a styrene butadiene rubber (SBR), an acrylic polymer, a polyvinylidinefluoride (PVDF), a polyethyleneoxide (PEO), a polyethyleneimine (PEI), a polysiloxane, or a combination thereof, and the binder can be present, for example, in an amount from to 0.1 to 2 wt % based on the total weight of the particle.

In embodiments, the encapsulated lithium particle (100) can be substantially spherically shaped. However, other shapes are contemplated herein, including, for example, asymmetric shapes, spheroids, fused or twined spheroids (e.g., a peanut shape), popcorn shape (e.g., minor agglomerates of the particles), and like shapes, or mixtures thereof.

The encapsulated lithium particles (100) are substantially non-reactive or non-combustive if exposed to air, oxygen, or water. The shell (120) encapsulates the lithium core (110) to substantially inhibit or prevent exposure and reaction of the lithium with ambient gases or liquids. The encapsulated lithium particles (100) can be substantially chemically inert, for example, to ambient exposure or to elevated temperature (e.g., 50, 100, 150, or even 200° C.) exposure to air, oxygen, water vapor, or a combination thereof. The encapsulated lithium particles may be sufficiently stable to be stored in air for at least one week, 2 weeks, 1 month, or even a year, without substantial chemical degradation, combustion, or both.

In embodiments, the disclosure provides an encapsulated lithium particle consisting essentially of:
a core and a shell, the shell encapsulates the core,
the core consists essentially of elemental lithium metal,
the shell consists essentially of a lithium salt, an oil, and a binder;
the shell directly contacts the core; and
the particle has a particle size of from 1 to 100 microns.

In embodiments, the disclosure provides a method of making the above mentioned encapsulated lithium particle, comprising, for example:
contacting lithium-containing core particles and a shell source material comprising a complex lithium metal salt, an oil, and a solvent; and
removing the solvent to produce the particles comprising a lithium-containing core and a shell encapsulating the core, the shell comprising the complex lithium metal salt and the oil.

In embodiments, the core can consist essentially of elemental lithium metal.

In embodiments, the encapsulated lithium composite particles can be made by contacting lithium metal particles with a shell source material that includes a lithium metal salt, an oil, and a binder, dissolved in a solvent. The shell source material can include a lithium salt or complex lithium salt as described above. The contacting can be performed by immersing the lithium core particles in the shell source material solution or by other means such as spray coating. After coating the particles with the shell source material, the solvent is removed to form a layer or shell over the lithium metal particles. Removal of the solvent can be performed by, for example, evaporation, centrifugation, and like suitable methods.

Due to its high reactivity and flammability, lithium metal is commonly stored under the cover of a viscous hydrocarbon such as mineral oil. While the mineral oil encapsulant inhibits degradation of the lithium metal, it is generally incompatible with most solid state devices. With the present stabilization approach, the lithium particles are safe to handle and store, and can be incorporated into a lithium ion device directly in their stabilized form since the oil component is encapsulated within the shell and does not interfere with the device.

In embodiments, encapsulated lithium particles can be produced by initially providing lithium metal or lithium metal-containing particles that are immersed in oil. By way of example, the oil can comprise silicone oil. Lithium metal particles suspended in silicone oil are commercially available from Sigma-Aldrich, St. Louis, Mo.

A vacuum filtration system, for example, can be used to wash the lithium particles. Due to the volatility of the lithium, both the washing to remove an organic solvent and contacting the lithium metal particles with the shell source material comprising a lithium metal salt to form the inorganic shell can be carried out in a controlled atmosphere such as a glove box that is free or substantially free of oxygen and water. Prior to contacting the lithium metal particles with the shell source material, the washed lithium particles can be dried in an inert atmosphere. The washed particles can be dried by heating the particles to evaporate the solvent, e.g., up to about 100° C.

To form the inorganic shell, a lithium salt, an oil, and an optional binder, are initially dissolved in a shell solvent to form a shell source material solution. Suitable dry, degassed, or both, solvents that are capable of dissolving the lithium salt include, for example, THF, n-methyl pyrrolidone (NMP), methylene chloride, and like solvents, or combinations thereof.

After contacting the lithium particles with solution of the shell source material the shell solvent can be removed to form a shell of the lithium salt over the particles. The solvent can be removed by, for example, evaporation, which may either occur naturally under environmental conditions of the preparation method or may be accelerated through various techniques including application of vacuum. For example, THF may be liberated through evaporation at room temperature and with no vacuum. In a further example, NMP may be removed by heating optionally with the application of vacuum. In embodiments, removal of the shell coating solvent can be performed at room temperature or by heating to at most about 150° C., e.g., about 30, 50, 75, or 100° C., including intermediate values and ranges. In embodiments, contacting and removing are performed at from 15° C. to 150° C.

The thickness (132) of the shell coating (120) shown in FIG. 1A can be determined by controlling the concentration of the lithium salt in the shell coating solution. Generally, a higher salt content in the solution will produce a thicker shell coating. A concentration in the shell coating solution of the lithium salt can be from about 0.1 to 4 molar, e.g., 0.1, 0.2, 0.5, 1, 2, 3, or 4 molar (M). In embodiments, the shell coating solution comprises a saturated solution of the lithium salt, an oil, and an optional binder.

In the resulting encapsulated lithium particles, the lithium salt shell can comprise from about 1 to 50 wt. % of the total mass of the particles. For instance, the shell coating can comprise, e.g., 0.1, 0.5, 1, 2, 5, 10, 20, 30, 40, or 50 wt. % of the total encapsulated particle mass including intermediate values and ranges. Together with the core particle composition, this thickness of the shell is selected to provide an effective barrier to the diffusion of air, oxygen, and water.

In the resulting encapsulated lithium particles, the oil can be present in from 0.1 to 30 wt % based on the total weight of the shell. In the resulting encapsulated lithium particles, the oil can be present in from 0.01 to 15 wt % based on the total weight of the particles.

In embodiments, the disclosure provides an electrode article, comprising:

a mixture of the aforementioned encapsulated lithium particles and a binder deposited on at least a portion of the surface of a carbon electrode.

In embodiments, the disclosure provides a method of making a lithium electrode article, comprising:

spraying a mixture comprised of the aforementioned encapsulated lithium particles comprising a lithium containing core, and a shell comprising a lithium salt, an oil, a binder, and an organic solvent, onto at least a portion of the surface of a carbon electrode.

In embodiments, the spraying of the mixture of the encapsulated lithium particles can be accomplished, for example, at from 0 to 200° C. The resulting sprayed mixture on at least a portion of the surface of a carbon electrode can optionally be dried for from 1 min to 12 hrs.

In embodiments, the disclosure provides a method of making a coated electrode having ambient environmentally stable encapsulated lithium particles comprising:

coating on a anode/negative electrode, a slurry mixture including a lithium metal powder dispersed in a solution of lithium complex salt, a mineral oil, and styrene butadiene rubber (SBR) binder, in an organic solvent to form a coat of lithium salt, mineral oil, and a binder, on the lithium metal powder in situ and then the electrode. The encapsulated lithium powder thus formed on the anode/negative electrode consists of a core encapsulated and surrounded by a protective coating of $LiPF_6$ and mineral oil. The core of the encapsulated lithium powder consists of lithium metal or lithium metal alloy with some other metal, for example, selected from the group of metals consisting of aluminum, silicon, germanium, tin, lead, bismuth, or combination thereof. The protective coating consists of a lithium salt, an oil, and an optional binder, and encapsulates and surrounds the lithium metal or lithium metal alloy core. The coating acts as a barrier between the ambient conditions and the core. The lithium metal core would react violently if not encapsulated and surrounded by the protective lithium salt and oil. The styrene butadiene rubber (SBR) acts as a binder which holds and helps in adhesion of the encapsulated lithium powder to the surface of anode/negative electrode. The single-step coating method can be accomplished by various coating procedures such as spray coating or dip coating. The disclosed single step method of coating an electrode involves the formation of the protective coating around the lithium metal powder in situ while coating the surface of an anode/negative electrode with a slurry mixture of a lithium metal powder dispersed in solution of the lithium salt, the oil, and an optional binder, in an organic solvent.

Mineral oil is one example of many oils that can be used. Different grades of mineral oil can be used as the oil component for shell (i.e., the outer protective coating). Mineral oils which are colorless, odorless, light mixtures of alkanes of from $C_{15}$ to $C_{40}$ can be selected. The core particle has a reactive and unstable lithium based core, which is coated with a protective coating mixture of a lithium salt, an oil, and an optional a binder. The lithium salt and oil protects the inner lithium based core from being exposed to the ambient conditions and avoids violently reacting with the ambient conditions. Since mineral oil and like oils are hydrophobic in nature the oil provides a supplementary benefit of repelling moisture in ambient air, which can increase the efficiency of the protective coating on the lithium core.

Figure 1B:
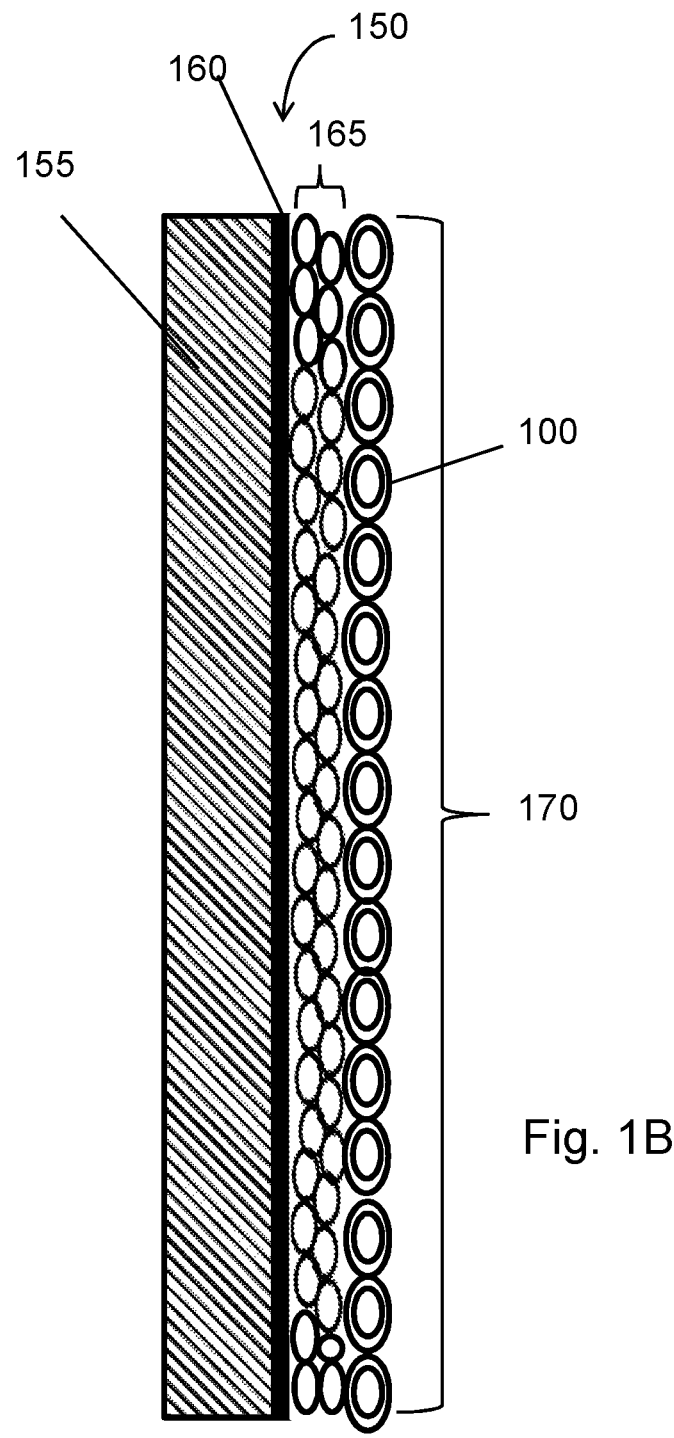

Referring to FIG. 1B, there is provided a schematic (not to scale) in cross-section of an exemplary coated electrode structure (150) having a current collector (155) (e.g., a metal such as Cu or Al), a thin carbon layer (160) (e.g., 1 to 20 microns), a thick carbon layer (165) (i.e., hard carbon particles and a PVDF binder; e.g., a thickness of about 50 to 200 microns such as 100 microns), and a layer (170) including encapsulated Li particles (100) and a binder. The encapsulated Li particles can include a binder in the particle shell and between particles when prepared and applied to the anode structure by the single-step method.

The encapsulated lithium powder formed in situ on the surface of the anode/negative electrode has considerable stability at ambient conditions and at elevated temperatures, such as up to 200° C. An anode/negative electrode coated with the disclosed encapsulated lithium powder is substantially stable when stored in air. The use of a lithium salt and oil as a protective coating provides an additional advantage as the lithium salt can be used as electrolyte salt in lithium ion devices so the coating does not cause interference in the performance of device. Once in the electrochemical device, the shell coat can readily dissolve in the electrolyte solvent, which solvent can include, for example, ethylene carbonate, propylene carbonate, dimethyl carbonate, diethyl carbonate, methyl propionate, an like other solvents, which are appropriate for use in an electrolyte for a lithium ion charge carrier.

The encapsulated lithium powder can be produced by initially acquiring lithium metal powder dispersed in mineral oil from Sigma Aldrich, St. Louis, Mo. Lithium metal is stable in mineral oil. Prior preparative processes for preparing lithium metal powder for anode surface deposition required stripping all the mineral oil. Alternatively, some of the mineral oil could be washed off the powder while keeping some fraction of the oil on the surface and then the particles could be used for further processing without having to add mineral oil later. All or part of the mineral oil can be stripped from the lithium metal powder by washing the lithium metal powder with an organic solvent such as hexanes, THF, methylene chloride, toluene, and heptane. For efficient washing purposes, the lithium metal powder dispersed in mineral oil should be stirred with an organic solvent such as hexane, heptane, toluene, chloroform, benzene, THF, methylene chloride, diethyl ether, and mixtures thereof, and can be then filtered using a vacuum filtration assembly or gravity filtration assembly. Due to the volatile and reactive nature of the lithium metal powder, the washing of the lithium metal powder with an organic solvent to strip the mineral oil and the single step coating method to form a encapsulated lithium particle powder on the surface of the anode/negative electrode can be carried out in water free and oxygen free, argon glove box. Other oils such as silicon oil, vegetable oil, or other synthetic or natural oils, can alternatively or additionally, be used in the method with appropriate solvents.

The lithium metal powder free of mineral oil, can be dispersed to form a slurry in a mixture of the lithium salt, the oil, and the binder, dissolved in an organic solvent. The slurry can be coated on the anode/negative electrode using, for example, spray coating or dip coating. The coated anode/negative electrode can be dried at, for example, 120° C. under vacuum to remove the organic solvent.

The thickness of the protective shell on the lithium metal powder can vary depending on the concentration of the lithium salt and oil. The higher the concentration of the salt, the thicker is the protective coating on the lithium metal based core. The coating solution, which consists of lithium salt and an oil in an organic solvent is generally a saturated solution of the lithium salt and oil.

In embodiments, the disclosure provides a composite electrode, made according to the disclosed method. The composite electrode was demonstrated for use in a lithium ion energy storage device. In embodiments, the electrode consists of, for example, a metallic current collector having two or more coatings. A first coating layer adjacent to the current collector can be, for example, a low surface area carbon material, a binder, and a carbon black. A second layer on the first layer can be, for example, the disclosed encapsulated lithium particle powder comprising lithium metal core particles coated with an encapsulating or encapsulant mixture of a lithium salt and an oil.

In embodiments, the disclosure provides a method to create a layer containing encapsulated lithium particles on the surface of an electrode structure. In embodiments, the disclosure provides a single step method for generating a protective coat or capsule around the lithium metal core particles in situ and coating of the surface of an anode/negative electrode with the resulting slurry mixture containing the encapsulated lithium particles. The lithium metal powder is first dispersed in solution of a suitable lithium salt, an suitable oil, and optionally a suitable binder, for example, a polymer such as SBR, in an organic solvent, to form the encapsulated lithium particles in situ. The resulting mixture containing the encapsulated lithium particles can used be directly to deposit the encapsulated lithium particles on the surface of an anode structure.

SEM Images of the Shell Encapsulated Particles

Referring to FIGS. 2A and 2B, FIGS. 2A and 2B, respectively, show a scanning electron microscope (SEM) image of the top or plan view (2A) and the cross sectional (2B) view of an anode/negative electrode coated with encapsulated lithium particle powder coated by the single step coating method. FIG. 2A shows a 100× magnification of $LiPF_6$-coated lithium metal particles that were spray coated from the disclosed single step coating method on a carbon electrode. FIG. 2B shows a cross-sectional view of the encapsulated lithium particle powder that was spray coated by the disclosed single step coating method on a carbon electrode. The images of the disclosed encapsulated lithium particles show a uniform protective coat of lithium salt and mineral oil on the surface of lithium metal powder having an average particle size of from 5 to 500 microns. The protective coat had a thickness of from 10 nm to 100 microns. Micrographs of the uncoated particles were not available due to their highly pyrophoric nature.

Figure 3:
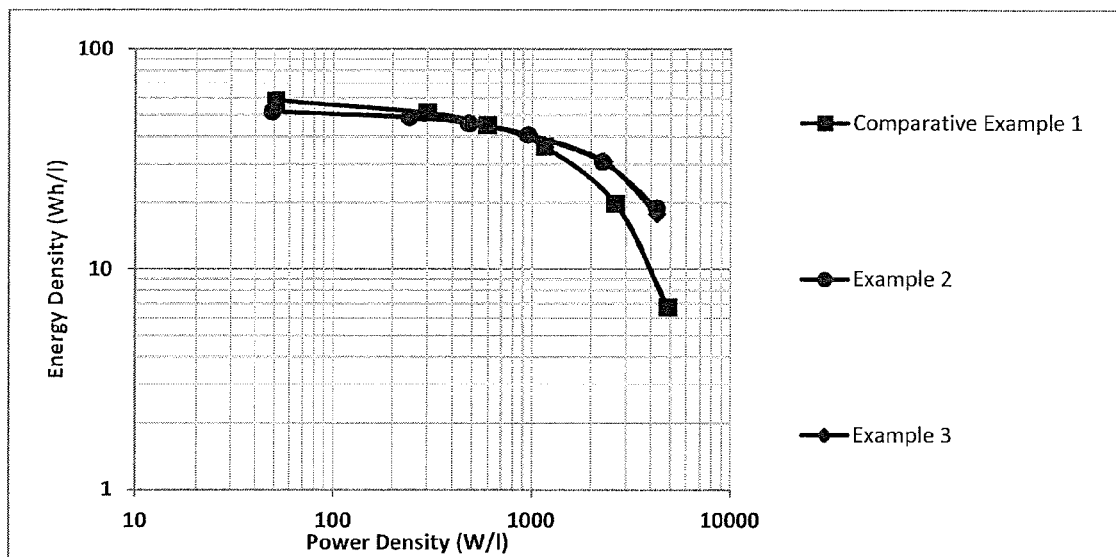
FIG. 3 shows a volumetric Ragone plot for lithium ion capacitors (LICs) having their anodes or negative electrodes manually coated with different encapsulated lithium powders.

FIG. 3 shows a volumetric Ragone plot for lithium ion capacitors (LICs) having their anodes or negative electrodes manually coated with different encapsulated lithium powders. The powders were prepared using different levels of oil (comparative: 0% oil; inventive: 17% and 22% of mineral oil). The plots demonstrate that significantly higher energy is attainable at high power for the disclosed encapsulated Li powders prepared with oil, which is a significant requirement for a power device, compared to the 0% oil example.

Figure 4:
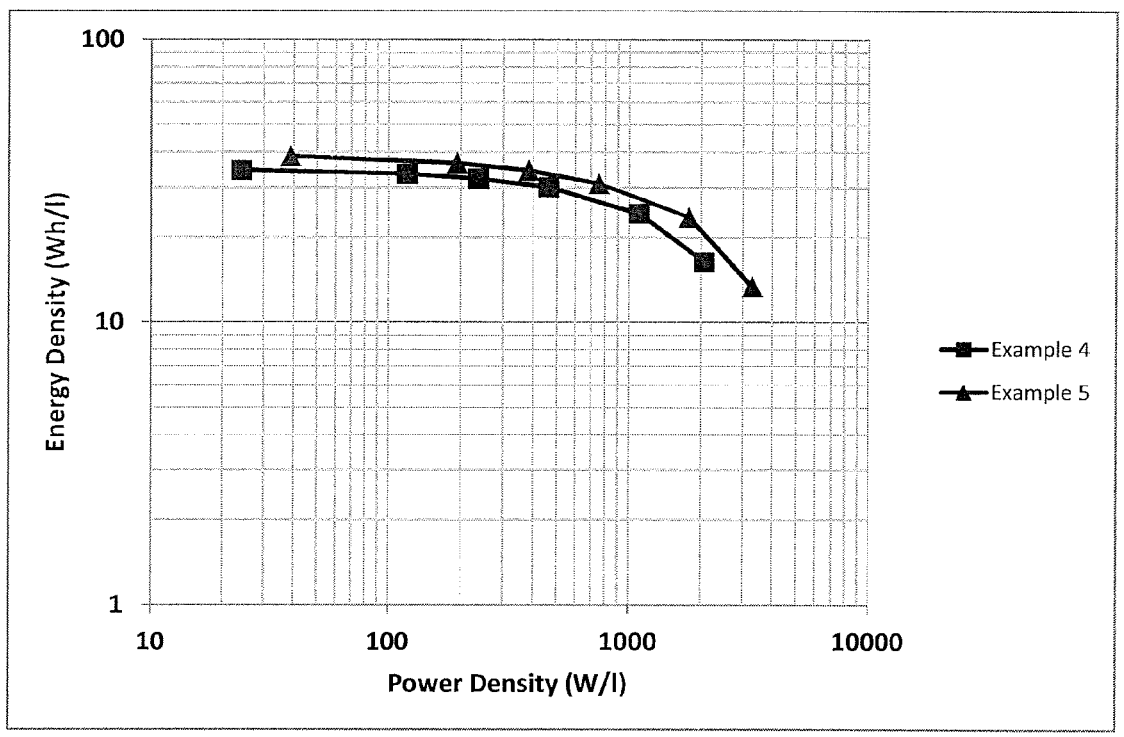
FIG. 4 shows a volumetric Ragone plot for selected lithium ion capacitors (LICs) having their anodes or negative electrodes coated with the disclosed encapsulated lithium powder from the disclosed single-step spray coating method, and a comparative example.

FIG. 4 shows a volumetric Ragone plot for selected lithium ion capacitors (LICs) having their anodes or negative electrodes coated with the disclosed encapsulated lithium powder from the disclosed single-step spray coating method, and a comparative example.

EXAMPLES

The following Examples demonstrate making, use, and analysis of the disclosed encapsulated lithium composite particles, coated electrodes, and methods of making and using in accordance with the above general procedures.

Comparative Example 1

THF Solvent-No Mineral Oil.

Lithium metal powder stored in mineral oil was acquired from Sigma Aldrich. The dispersion of lithium metal in mineral oil was gravity filtered through a funnel with a Whatman paper no. 41 to separate most of the mineral oil from the lithium. The lithium powder in the filter paper was washed under argon with hexanes until free of mineral oil. The washed lithium metal powder was then dried under argon atmosphere for 12 hrs. The lithium powder was weighed. $LiPF_6$ was weighed in a separate vial to keep the ratio of lithium metal powder to $LiPF_6$ as 80:20 (wt %). The $LiPF_6$ was then dissolved in THF while maintaining the ratio of THF to $LiPF_6$ at 80:20 (wt %). The $LiPF_6$ in THF solution was stirred until the $LiPF_6$ was completely dissolved. The $LiPF_6$ solution in THF was contacted with the lithium metal powder by pouring the solution on the lithium metal powder. The mixture of lithium metal powder and $LiPF_6$ in THF was stirred until the solvent evaporated. The resulting coated lithium metal powder was then dried under vacuum at 100° C. for 12 hrs to entirely remove the THF. An SEM image of the sample of the encapsulated lithium powder was obtained (not shown; see FIG. 2 in copending U.S. Ser. No. 13/673, 019). The resulting encapsulated lithium powder was used as a lithium metal source in the construction of a lithium ion capacitor. The lithium salt encapsulated lithium particles or lithium composite powder (LCP) was manually spread on the surface of the anode electrode. A lithium ion capacitor was constructed in a CR2032 cell (coin cell) format. The lithium ion capacitor was built by stacking: a cathode electrode made from 85 wt % of a wheat flour based alkali activated carbon. The activated carbon was made from a wheat flour precursor. Wheat flour was carbonized to 650 to 700° C. The carbonized carbon was ground to a particle size of approximately 5 microns. The ground carbonized carbon was then activated at 750° C. with KOH (alkali) with a weight ratio of 2.2:1 KOH:carbon for 2 hrs. The alkali activated carbon was further washed with water to remove residual KOH. The resulting activated carbon was then treated with aqueous 0.1 M HCl to neutralize any trace of KOH and then washed with water to neutralize the carbon to pH 7. The activated carbon was then heat-treated under nitrogen forming gas (e.g., 98 vol % $N_2$ and 2 vol % $H_2$) at 900° C. for 2 hours. The resulting electrode consisted of 85% of the wheat flour based alkali activated carbon, 10 wt % PTFE (Dupont 601A Teflon PTFE), and 5 wt % Cabot Black Pearl 2000, with an NKK-4425 separator, and 5 mg of the encapsulated lithium particle powder (manually-spread on the anode and is used for pre-doping the anode) and the NPC-15 (Needle Coke) anode in an aluminum clad coin cell. The PVDF based anode electrodes consisted of 90 wt % of NPC-15 from Asbury Carbons, 5 wt % Timcal Super C-45 conductive carbon, and 5 wt % of KYNAR 761 grade PVDF (molecular weight: 300,000 to 400,000) as a binder. 120 microL of 1 M $LiPF_6$ in 20:20:60 ratio of ethylene carbonate:dimethyl carbonate:methyl propionate (wt:wt:wt) with 5 wt % fluorinated ethylene carbonate was used as an electrolyte. The cell was conditioned at constant current charge/discharge at 0.5 mA current from 3.8V to 2.2V on an Arbin BT 2000. The cell was then tested with electrochemical impedance spectroscopy on a Gamry potentiostat/galvanostat with Framework 5 software. The rate performance of the cell was tested on the Arbin BT2000 by charging the cell at 1 C rate and discharging cell at different C-rates. FIG. 3 shows the energy density versus power density plot for this comparative encapsulated lithium powder having a shell coat of 100 wt % $LiPF_6$ and 0 wt % mineral oil on the lithium metal core. The LIC showed 58.39 Wh/l energy density at 1 C rate. The LIC showed 6.71 Wh/l of energy density at 100 C rate.

Examples 2, 3, and 4 demonstrate: making the encapsulated lithium powder containing mineral oil; the application of the encapsulated lithium powder in devices; and higher discharge rate performance of the electrodes utilizing these powders in devices.

Example 2

Example 1 was repeated except that encapsulated lithium powder had a shell coat of 83 wt % of $LiPF_6$ (lithium hexafluorophosphate) and 17 wt % of mineral oil, but no binder, on the lithium metal core. The total ratio of the lithium metal core to the shell coat was 80:20 (wt %). FIG. 3 shows the energy density versus power density plot for this encapsulated lithium powder. The LIC showed 51.99 Wh/l energy density at 1 C rate. The LIC showed 18.94 Wh/l of energy density at 100 C rate. About a three-fold increase in energy density at the same rate shows the performance advantage of the coating containing the mineral oil compared to Comparative Example 1 where coating was free of mineral oil.

Example 3

Example 2 was repeated except that encapsulated lithium powder had a shell coat comprised of 79 wt % of $LiPF_6$ and 21 wt % of mineral oil, but no binder, on the lithium metal core. The total ratio of lithium metal core to shell coat was 80:20 (wt %). FIG. 3 shows the energy density versus power density plot for this encapsulated lithium powder. The LIC showed 52.21 Wh/l energy density at 1 C rate. The LIC showed 17.84 Wh/l of energy density at 100 C rate, again showing the advantage of the addition of mineral oil. Table 1 lists a comparison of the performance of electrodes that were manually coated or manually spread with encapsulated lithium powders with and without mineral oil coating. All the points in the graph of FIG. 3 of Example 2 and Example 3 are coincident or nearly so and a single curve accommodates the data points for both Example 2 and Example 3.

TABLE 1

Comparison of the performance of manually coated or spread encapsulated lithium powders with and without mineral oil coating.

| Example | Anode Electrode Composition | | | Shell Composition | | | | Total Solids:solvent ratio[1] (wt:wt) | Encap lithium particle loading (mg) | LIC Energy Density at 100 C. rate (Wh/l) |
|---|---|---|---|---|---|---|---|---|---|---|
| | Carbon Precursor | PVDF type (KYNAR grade) | Conductive carbon | $LiPF_6$ (wt %) | Mineral Oil (wt %) | SBR binder (wt %) | Shell:Core (wt:wt) | | | |
| Comparative 1 | Coke | 761 | Timcal Super C-45 | 100 | 0 | 0 | 20:80 | 20:80 | 5 | 6.71 |
| 2 | Coke | 761 | Timcal Super C-45 | 83 | 17 | 0 | 20:80 | 20:80 | 5 | 18.94 |
| 3 | Coke | 761 | Timcal Super C-45 | 79 | 21 | 0 | 20:80 | 20:80 | 5 | 17.84 |

[1]Total Solids is the weight of the shell forming mixture and lithium metal core including the shell incorporated oil. The solvent was THF.

The following examples demonstrate a method to attach the lithium salt, oil, and binder, encapsulated or coated lithium particles to an electrode, and the performance of the resulting electrode in devices. This attachment method is preferred, for example, in the fabrication of large size cells and in the continuous fabrication of electrodes. To ensure high robustness of the disclosed electrodes, using a binder in the shell coating formulation is preferred to adequately adhere the particles to the electrode surface.

Example 4

Lithium metal powder stored in mineral oil was acquired from Sigma Aldrich, and the dispersion was gravity filtered through a funnel with a Whatman paper no. 41 to separate most of the mineral oil from the lithium. The lithium powder in the filter paper is washed under argon with hexanes until free of mineral oil. The washed lithium metal powder was then dried under argon atmosphere for 12 hrs. Next 1.5 g of the dry lithium metal powder was weighed into a spray coating container. 0.33375 g $LiPF_6$, 0.04125 g of mineral oil, and 0.942 g of a 1 wt % solution of SBR binder in THF was weighed in a separate glass vial. 3.46 g of THF was added to the shell forming material mixture so that the solute (shell forming material mixture and insoluble lithium metal core) to organic solvent (THF) ratio was 20:80 by weight. The shell forming mixture was stirred for 10 min to completely dissolve the $LiPF_6$, the mineral oil, and the SBR binder in THF. The shell forming material solution was added to the spray container having the lithium metal powder. The combined lithium metal powder and shell forming slurry was stirred to maintain a homogeneous dispersion. The slurry was then spray coated on a 14 mm disc anode/negative electrode made from 90 wt % coke based carbon (NPC-15 from Asbury Carbons), 5 wt % Timcal Super C-45 (a conductive carbon black from Timcal), and 5 wt % KYNAR HSV 900 as a binder. The spray coated electrode was dried at 120° C. under vacuum for 12 hrs to remove the THF. A loading of 8 mg of the encapsulated lithium powder was achieved on the anode/negative electrode after drying. The electrodes showed no flaking and excellent adhesion of the encapsulated lithium powder on the electrode surface.

A lithium ion capacitor was constructed in a CR2032 cell (coin cell) format by stacking a cathode electrode made from 85 wt % of the above mentioned wheat flour based alkali activated carbon, 10 wt % PTFE (Du Pont 601A Teflon PTFE), and 5 wt % Cabot Black Pearl 2000, with an NKK-4425 (Nippon Kodoshi Corporation) cellulose based separator, and the spray coated coke based anode with KYNAR HSV 900 as a binder in the aluminum clad coin cell. 120 microL of 1M $LiPF_6$ in 20:20:60 ratio of ethylene carbonate:dimethyl carbonate:methyl propionate (wt:wt:wt) with 5 wt % fluorinated ethylene carbonate was used as an electrolyte. The cell was conditioned at constant current charge/discharge at 0.5 mA current from 3.8V to 2.2V on an Arbin BT 2000. The discharge rate performance of the cell was tested on the Arbin BT2000 by charging the cell at 1 C rate and discharging the cell at different C-rates.

FIG. 4 shows the energy density versus power density plot for Example 4 having an encapsulated lithium powder prepared with a shell coat of 87 wt % $LiPF_6$, 10.5 wt % mineral oil, and 2.5 wt % SBR binder, on the lithium metal core. The total ratio of lithium metal core to shell coat was 80:20 (wt %). The lithium ion capacitor (LIC) for Example 4 had a 34.56 Wh/l energy density at 1 C rate. The LIC showed 18.20 Wh/l of energy density at 100 C rate.

Another set of spray coated electrodes, prepared as described above were brought out of glove-box (argon atmosphere) storage and placed in a petri-dish under ambient conditions in a hood and monitored under an optical microscope for their stability. The disclosed encapsulated lithium powder coated on the anode/negative electrode showed stability for 2 hrs under ambient conditions.

Example 5

Example 4 was repeated except for the slurry sprayed on the 14 mm disc anode/negative electrode consisted of total solids (shell forming mixture and lithium metal core) to organic solvent (THF) ratio of 30:70 by weight and a loading of 7.1 mg of the encapsulated lithium powder was achieved on the anode/negative electrode after drying.

FIG. 4 shows the energy density versus power density plot for Example 5 having an encapsulated lithium powder prepared with a shell coat of 87 wt % $LiPF_6$, 10.5 wt % mineral oil, and 2.5 wt % SBR binder, on the lithium metal core. The total ratio of lithium metal core to shell coat was 80:20 (wt %). The lithium ion capacitor (LIC) for Example 5 had a 38.67 Wh/l energy density at 1 C rate. The LIC showed 13.37 Wh/l of energy density at 100 C rate.

Another set of spray coated electrodes, prepared as described above were brought out of the glove-box (argon atmosphere) and placed in a petri-dish under ambient conditions in a hood and monitored under an optical microscope for their stability. The disclosed encapsulated lithium powder coated on the anode/negative electrode showed stability for 2 hrs under ambient conditions.

TABLE 2

Comparison of the single step spray coated electrodes with encapsulated lithium powder.

| | Anode Electrode Composition | | | Shell Composition | | | | | Encap lithium | LIC Energy |
| --- | --- | --- | --- | --- | --- | --- | --- | --- | --- | --- |
| Example | Carbon Precursor | PVDF type (KYNAR grade) | Conductive carbon | $LiPF_6$ (wt %) | Mineral Oil (wt %) | SBR binder (wt %) | Shell:Core (wt:wt) | Total Solids:solvent[1] (wt:wt) | particle loading (mg) | Density at 100 C. (Wh/l) |
| 4 | Coke | HSV 900 | Timcal Super C-45 | 87 | 10.5 | 2.5 | 20:80 | 20:80 | 8.0 | 18.20 |
| 5 | Coke | HSV 900 | Timcal Super C-45 | 87 | 10.5 | 2.5 | 20:80 | 30:70 | 7.1 | 13.37 |

[1]Total Solids is the weight of the shell forming mixture and lithium metal core. The solvent was THF.

The disclosure has been described with reference to various specific embodiments and techniques. However, it should be understood that many variations and modifications are possible while remaining within the scope of the disclosure.

What is claimed is:

1. An encapsulated lithium particle comprising:
   a core comprised of at least one of: lithium; a lithium metal alloy; or a combination thereof; and
   a shell comprised of a lithium salt, and an oil,
   the shell encapsulates the core, and the particle has a diameter of from 1 to 500 microns, wherein the lithium salt is selected from the group consisting of $LiPF_6$, $LiBF_4$, $LiClO_4$, $LiAsF_6$, $LiF_3SO_3$, lithium bis-oxalatoborate, lithium fluoro-oxalatoborate, and combinations thereof, the shell is present in from 50 to 10 wt % based on the total weight of the particle, and the shell comprises from 70 to 99.9 wt % of the lithium salt and from 0.1% to 30 wt % of the oil based on the total weight of the shell.

2. The particle of claim 1, wherein:
   the core is present in from 50 to 90 wt % based on the total weight of the particle;
   and
   the shell has an average thickness of from 0.01 to 100 microns.

3. The particle of claim 1, wherein the oil is selected from the group consisting of a mineral oil, a transformer oil or insulating oil, a silicone oil, a silicone-based oil, a fluorinated hydrocarbon, a vegetable based oil, white oil, liquid paraffin, pariffinum liquidum, liquid petroleum, or combinations thereof.

4. The particle of claim 1, further comprising the shell having a binder selected from the polymer group consisting of a styrene butadiene rubber (SBR), an acrylic polymer, a polyvinylidinefluoride (PVDF), a polyethyleneoxide (PEO), a polyethyleneimine (PEI), a polysiloxane, or a combination thereof, and the binder is present in an amount from to 0.1 to 2 wt % based on the total weight of the particle.

5. The particle of claim 1, wherein the lithium metal alloy is selected from the group of metals consisting of aluminum, silicon, germanium, tin, lead, bismuth, and combination thereof.

6. The particle of claim 1, wherein:
the particle has a diameter of from 1 to 100 microns; and
the shell has an average thickness of from 1 to 50 microns.

7. The particle of claim 1, wherein the particle is substantially spherically shaped.

8. The particle of claim 1, wherein the particle is substantially chemically inert in an ambient environment comprising oxygen, water vapor, or a combination thereof.

9. An encapsulated lithium particle consisting essentially of:
a core and a shell, the shell encapsulates the core,
the core consists essentially of elemental lithium metal,
the shell consists essentially of a lithium salt, an oil, and a binder;
the shell directly contacts the core; and
the encapsulated lithium particle has a size of from 1 to 100 microns, wherein the lithium salt is selected from the group consisting of $LiPF_6$, $LiBF_4$, $LiClO_4$, $LiAsF_6$, $LiF_3SO_3$, lithium bis-oxalatoborate, lithium fluoro-oxalatoborate, and combinations thereof, the shell is present in from 50 to 10 wt % based on the total weight of the particle, and the shell comprises from 70 to 99.9 wt % of the lithium salt and from 0.1% to 30 wt % of the oil based on the total weight of the shell.

10. A method of making the encapsulated lithium particle of claim 1, comprising:
contacting lithium-containing core particles and a shell source material comprising a complex lithium metal salt, an oil, and a solvent; and
removing the solvent to produce the particles comprising a lithium-containing core and a shell encapsulating the core, the shell comprising the complex lithium metal salt and the oil, wherein the lithium salt is selected from the group consisting of $LiPF_6$, $LiBF_4$, $LiClO_4$, $LiAsF_6$, $LiF_3SO_3$, lithium bis-oxalatoborate, lithium fluoro-oxalatoborate and combinations thereof.

11. The method of claim 10, wherein the core consists essentially of elemental lithium metal.

12. The method of claim 10, wherein
the solvent is selected from the group consisting of THF, methylene chloride, toluene, diethyl ether, monoglyme, diglyme, n-methyl pyrolidinone, dimethyl acetamide, dimethyl formamide, or mixture thereof, and
the method is accomplished entirely below the melting point of lithium.

13. The method of claim 10, wherein a concentration of the lithium salt in the shell source material is of from 0.1 to 4 M, and the concentration of oil in the shell source material is from 0.1 to 30 wt % based on the total weight of the shell.

14. The method of claim 10, wherein contacting and removing are performed at from 15° C. to 150° C.

15. The method of claim 10, wherein removing the solvent is accomplished by evaporation, filtration, centrifugation, or combination thereof.

16. The method of claim 10, further comprising washing the lithium-containing particles with a cleaning solvent prior to contacting the particles with the shell source material, the cleaning solvent being selected from the group consisting of hexane, heptane, toluene, chloroform, benzene, THF, methylene chloride, diethyl ether, or a mixture thereof.

17. An electrode article, comprising:
a mixture of the encapsulated lithium particles of claim 1 and a binder deposited on at least a portion of a surface of a carbon electrode.

18. A method of making a lithium electrode article, comprising:
spraying a mixture comprised of the encapsulated lithium particles of claim 1 comprising a lithium containing core, and a shell comprising a lithium salt, an oil, a binder, and an organic solvent, onto at least a portion of the surface of a carbon electrode, wherein the lithium salt is selected from the group consisting of $LiPF_6$, $LiBF_4$, $LiClO_4$, $LiAsF_6$, $LiF_3SO_3$, lithium bis-oxalatoborate, lithium fluoro-oxalatoborate and combinations thereof.

19. The method of claim 18 wherein the resulting sprayed mixture is dried for from 1 min to 12 hrs.

* * * * *